(12) United States Patent
Guo et al.

(10) Patent No.: US 10,782,548 B2
(45) Date of Patent: Sep. 22, 2020

(54) OPTICAL STRUCTURE AND METHOD FOR CONTROLLING THE SAME, DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Yuanhui Guo, Beijing (CN); Gangqi Huang, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/340,585

(22) PCT Filed: May 17, 2018

(86) PCT No.: PCT/CN2018/087255
§ 371 (c)(1),
(2) Date: Apr. 9, 2019

(87) PCT Pub. No.: WO2019/029219
PCT Pub. Date: Feb. 14, 2019

(65) Prior Publication Data
US 2019/0250437 A1    Aug. 15, 2019

(30) Foreign Application Priority Data
Aug. 9, 2017 (CN) .......................... 2017 1 0676551

(51) Int. Cl.
*G02F 1/1334* (2006.01)
*G02F 1/1343* (2006.01)
*G02F 1/133* (2006.01)

(52) U.S. Cl.
CPC .......... *G02F 1/1334* (2013.01); *G02F 1/1343* (2013.01); *G02F 1/13318* (2013.01); *G02F 1/134309* (2013.01)

(58) Field of Classification Search
CPC ................. G02F 1/1334; G02F 1/1343; G02F 1/134309; G02F 1/13318; G02F 2201/58; C03C 4/04
See application file for complete search history.

(56) References Cited

U.S. PATENT DOCUMENTS 6,144,359 A * 11/2000 Grave ............... G02F 1/133605
345/102
2001/0028501 A1* 10/2001 Hunter .................... G02F 1/135
359/449

(Continued)

FOREIGN PATENT DOCUMENTS

CN    101521243 A    9/2009
CN    204832719 U    12/2015

(Continued)

OTHER PUBLICATIONS

First Office Action for Chinese Application No. 201710676551.3, dated Jul. 30, 2019, 7 Pages.

(Continued)

*Primary Examiner* — Jia X Pan
(74) *Attorney, Agent, or Firm* — Brooks Kushman P.C.

(57) ABSTRACT

An optical structure and a method for controlling the same, and a display device are provided. The optical structure includes a light adjustment component, optical sensing components and a controller. The light adjustment component is divided into at least two sub-regions. The optical sensing components acquire an intensity of ambient light irradiating onto each sub-region of the light adjustment component. The controller controls a light transmittance of (Continued)

the corresponding sub-region based on the intensity of the ambient light irradiating onto the corresponding sub-region.

14 Claims, 3 Drawing Sheets

(56) References Cited

U.S. PATENT DOCUMENTS

| | | | |
|---|---|---|---|
| 2003/0230725 A1* | 12/2003 | Wong | G01J 1/42 250/372 |
| 2008/0152879 A1 | 6/2008 | Nashiki et al. | |
| 2011/0255035 A1 | 10/2011 | Wu | |
| 2019/0118624 A1* | 4/2019 | Chu | B60J 3/04 |

FOREIGN PATENT DOCUMENTS

| | | | |
|---|---|---|---|
| CN | 105929576 A | 9/2016 | |
| CN | 106200187 A | 12/2016 | |
| CN | 106205502 A | 12/2016 | |
| CN | 205899213 U | 1/2017 | |
| CN | 107255877 A | 10/2017 | |
| JP | 2000284254 A | 10/2000 | |

OTHER PUBLICATIONS

International Search Report and Written Opinion for Application No. PCT/CN2018/087255, dated Jul. 2, 2018, 11 Pages.

* cited by examiner

OPTICAL STRUCTURE AND METHOD FOR CONTROLLING THE SAME, DISPLAY DEVICE

CROSS REFERENCE OF RELATED APPLICATIONS

This application is the U.S. national phase of PCT Application No. PCT/CN2018/087255 filed on May 17, 2018, which claims priority to Chinese Patent Application No. 201710676551.3 filed on Aug. 9, 2017, which are incorporated herein by reference in their entireties.

TECHNICAL FIELD

The present disclosure relates to the field of optical technologies, and in particular to an optical structure and a method for controlling the same, and a display device.

BACKGROUND

Polymer Dispersed Liquid Crystal (PDLC) is a method in which a low molecular liquid crystal is mixed with a prepolymer and polymerized in certain conditions to form micron-sized liquid crystal droplets uniformly dispersed in a polymer network. A material having electro-optical response characteristics is obtained by using dielectric anisotropy of liquid crystal molecules. PDLC has two working states including a scattering state and transparent state, and has a certain gray level, which has attracted extensive attention and has broad application prospects.

The preparation process of PDLC devices is simple, and has been widely used in large-area flexible displays, optical modulators, thermal and pressure sensitive devices, electronically controlled glass, light valves, projection displays, and e-books. After the voltage is applied to the PDLC device in the related art, the liquid crystal molecules of the PDLC begin to align normally, the light passes there through, and the transmittance increases. However, when the illumination time is long, the light pollution is likely to occur, or the aging of the irradiated article due to ultraviolet light is serious. Therefore, it is necessary to manually adjust the voltage applied to the polymer dispersed liquid crystal to adjust the transmittance of the light, which is inconvenient to operate.

SUMMARY

An optical structure is provided in the present disclosure, including:

a light adjustment component;

an optical sensing component arranged on a surface of the light adjustment component, where the optical sensing component is configured to acquire an intensity of ambient light irradiating onto the light adjustment component; and a controller, coupled to the optical sensing component and the light adjustment component.

Optionally, the optical sensing component includes:

a photosensitive layer, where a resistivity of the photosensitive layer is decreased with an increasing of the intensity of the ambient light irradiating onto the light adjustment component;

a first transparent electrode and a second transparent electrode at opposite sides of the photosensitive layer and being opposite to each other;

where the controller is coupled to the first transparent electrode and the second transparent electrode and configured to apply a voltage to the first transparent electrode and the second transparent electrode.

Optionally, the light adjustment component includes:

a third transparent electrode and a fourth transparent electrode;

an optical film layer between the third transparent electrode and the fourth transparent electrode, where a light transmittance of the optical film layer is increased with an increasing of a voltage difference between the third transparent electrode and the fourth transparent electrode;

where the controller is coupled to the third transparent electrode and the fourth transparent electrode, and configured to apply a voltage to the third transparent electrode, apply the voltage on the second transparent electrode to the fourth transparent electrode, and adjust the light transmittance of the optical film layer by controlling a voltage difference between the second transparent electrode and the third transparent electrode.

Optionally, the second transparent electrode and the fourth transparent electrode are integrated with each other, the third transparent electrode is at a side of the second transparent electrode away from the first transparent electrode.

Optionally, where the optical film layer is a polymer dispersed liquid crystal layer.

Optionally, the optical structure further includes:

a controllable switch, where a first end of the controllable switch is coupled to the first transparent electrode, a second end of the controllable switch is coupled to the second transparent electrode;

where the controller is further configured to control the controllable switch to be turned on to short the first transparent electrode and the second transparent electrode, apply a voltage to the third transparent electrode in response to a user instruction, and adjust the light transmittance of the optical film layer by controlling the voltage difference between the second transparent electrode and the third transparent electrode.

Optionally, a material of the photosensitive layer includes selenium, aluminum sulfide, lead sulfide, bismuth sulfide or cadmium sulfide.

A method for controlling an optical structure, where the optical structure includes:

a light adjustment component including at least two sub-regions;

at least two optical sensing components arranged on a surface of the light adjustment component and being in a one-to-one correspondence to positions of the sub-regions, each optical sensing component is configured to acquire an intensity of ambient light irradiating onto a corresponding sub-region; and a control component, coupled to the optical sensing component and the light adjustment component, the method includes:

acquiring an intensity of ambient light irradiating onto each sub-region of the light adjustment component; and controlling a light transmittance of the each sub-region based on the intensity of the ambient light irradiating onto the each sub-region.

Optionally, the controlling the light transmittance of the each sub-region based on the intensity of the ambient light irradiating onto the each sub-region further includes:

in the case that the intensity of the ambient light irradiating onto the each sub-region of the light adjustment component is smaller than a first set value and then a resistivity of the photosensitive layer corresponding to the each sub-region is larger than a second set value, applying a first voltage to the first transparent electrode and the third transparent electrode, and controlling a voltage on the second transparent electrode corresponding to the each sub-region to be a second voltage, to enable, by controlling a voltage difference between the first voltage and the second voltage, the light transmittance of the each sub-region to be increased.

Optionally, the controlling the light transmittance of the each sub-region based on the intensity of the ambient light irradiating onto the each sub-region further includes:

in the case that the intensity of the ambient light irradiating onto the each sub-region of the light adjustment component is larger than a first set value and then a resistivity of the photosensitive layer corresponding to the each sub-region is smaller than a second set value, applying a first voltage to the first transparent electrode and the third transparent electrode, and controlling a voltage on the second transparent electrode corresponding to the each sub-region to be a second voltage, to enable, by controlling a voltage difference between the first voltage and the second voltage, the light transmittance of the each sub-region to be decreased.

Optionally, the method further includes:

controlling the first transparent electrode and the second transparent electrode to short with each other;

applying a third voltage to the first transparent electrode and the second transparent electrode, applying a fourth voltage to the third transparent electrode in response to a user instruction, to control the light transmittance of the optical film layer by adjusting a voltage difference between the third transparent electrode and the fourth transparent electrode.

Optionally, the controlling the light transmittance of the each sub-region based on the intensity of the ambient light irradiating onto the each sub-region further includes:

adjusting the light transmittance of the each sub-region, by applying a first voltage to the first transparent electrode and the third transparent electrode of the each sub-region and controlling a second voltage of the second transparent electrode corresponding to the each sub-region.

Optionally, the method further includes:

in the case that the intensity of the ambient light irradiating onto the each sub-region of the light adjustment component decreases and then a resistivity of the photosensitive layer corresponding to the each sub-region is increased, applying the first voltage to the first transparent electrode and the third transparent electrode, and controlling the second voltage on the second transparent electrode corresponding to the each sub-region to change away from a value of the first voltage, to enable a voltage difference between the first voltage and the second voltage to be increased to increase the light transmittance of the each sub-region.

Optionally, the method further includes:

in the case that the intensity of the ambient light irradiating onto the each sub-region of the light adjustment component increases and then a resistivity of the photosensitive layer corresponding to the each sub-region is decreased, applying the first voltage to the first transparent electrode and the third transparent electrode, and controlling the second voltage on the second transparent electrode corresponding to the each sub-region to change towards a value of the first voltage, to enable a voltage difference between the first voltage and the second voltage to be decreased to decrease the light transmittance of the each sub-region.

Optionally, the method further includes:

controlling the light transmittance of the each sub-region based on the intensity of the ambient light irradiating onto the each sub-region, and enabling the light transmittances of at least two sub-regions of the light adjustment component to be identical.

A display device including the optical structure hereinabove is further provided in the present disclosure.

An optical structure is further provided, including:

a first transparent electrode and a second transparent electrode opposite to each other;

a photosensitive layer between the first transparent electrode and the second transparent electrode, where the first transparent electrode and the second transparent electrode are at opposite sides of the photosensitive layer;

a third transparent electrode and a fourth transparent electrode opposite to each other;

an optical film layer between the third transparent electrode and the fourth transparent electrode, where the third transparent electrode and the fourth transparent electrode are at opposite sides of the photosensitive layer; and a controller, coupled to the first transparent electrode and the third transparent electrode and configured to apply a voltage to the first transparent electrode and the third transparent electrode respectively.

Optionally, the second transparent electrode and the fourth transparent electrode are integrated with each other, the third transparent electrode is at a side of the second transparent electrode away from the first transparent electrode.

Optionally, a resistivity of the photosensitive layer is negatively correlated with the ambient light irradiating;

a light transmittance of the optical film layer is positively correlated with a voltage difference between the third transparent electrode and the fourth transparent electrode.

Optionally, the optical structure further includes:

a switch, where a first end of the switch is coupled to the first transparent electrode, a second end of the switch is coupled to the second transparent electrode;

the controller is further configured to control the switch to be turned on to short the first transparent electrode and the second transparent electrode, apply a voltage to the third transparent electrode in response to a user instruction, and adjust the light transmittance of the optical film layer by controlling the voltage difference between the second transparent electrode and the third transparent electrode.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
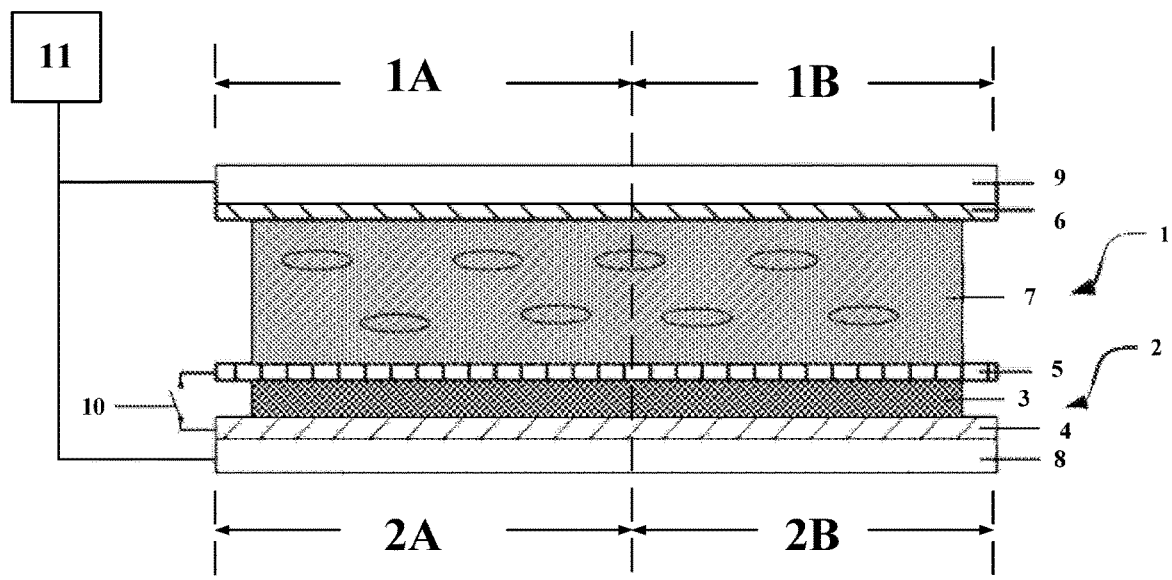
FIG. 1 is a schematic view of an optical structure in some embodiments of the present disclosure.
Figure 2:
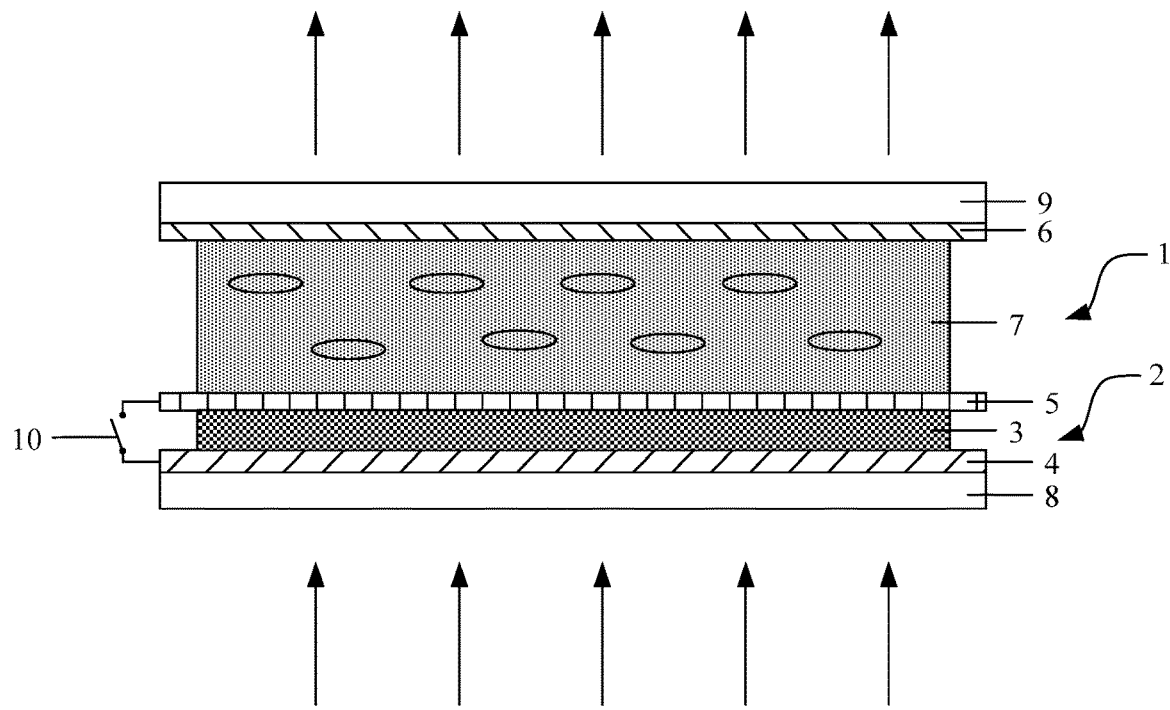
FIG. 2 is a schematic view showing an operation of an optical structure working in an automatic adjustment mode when the optical structure is transparent in some embodiments of the present disclosure.
Figure 3:
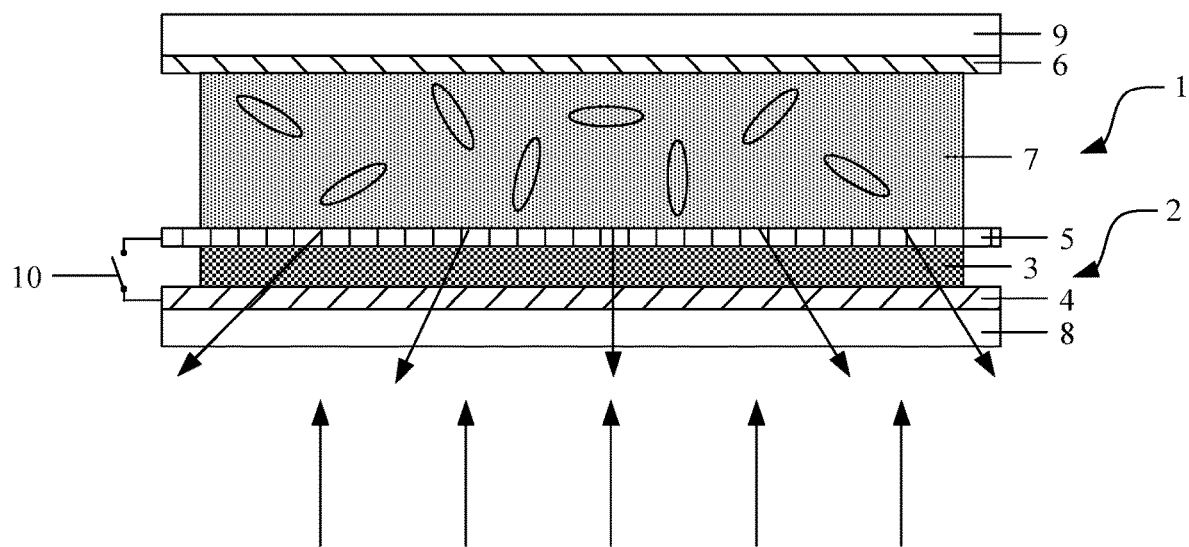
FIG. 3 is a schematic view showing an operation of an optical structure in an automatic adjustment mode when the optical structure is opaque in some embodiments of the present disclosure.

As shown in FIG. 1 to FIG. 3, an optical structure is provided in some embodiments of the present disclosure, including:

a light adjustment component 1 including at least two sub-regions 1A and 1B;

at least two optical sensing components 2A and 2B arranged on a surface of the light adjustment component 2 and being in a one-to-one correspondence to positions of the sub-regions, each optical sensing component 2 is configured to acquire a parameter relating to an intensity of ambient light irradiating onto a corresponding sub-region; and a controller 11, coupled to the optical sensing component 2 and the light adjustment component 1 and configured to control a light transmittance of the corresponding sub-region based on the intensity of the ambient light irradiating onto the corresponding sub-region.

The optical structure hereinabove acquires parameters related to the intensity of ambient light by the optical sensing component, and controls the light transmittance of the light adjustment component based on parameters related to the intensity of ambient light, thereby being capable of automatically adjusting the light transmittance of the optical structure based on the intensity of ambient light without a manual adjusting operation and then improving the user experience. In addition, each sub-region of the light adjustment component is controlled independently, and the light transmittance of each sub-region is controlled based on the parameters related to the intensity of ambient light irradiating onto the each sub-region, so that the light transmittance of the entire light adjustment component may be ensured to be uniform, thereby realizing a better user experience.

According to the embodiments of the present disclosure, when the intensity of the ambient light is strong, it is able to decrease the light transmittance of the optical structure, so as to delay the aging degree and time of the irradiated article. In addition, when the intensity of the ambient light is poor, it is able to increase the light transmittance of the optical structure, thereby improving a utilization ratio of the light, which is more flexible. Moreover, by independently controlling each sub-region of the light adjustment component, it is able to enable the light transmittance of the entire light adjustment component to be uniform, therefore, when the light adjustment component is applied to the flat lighting product, the appearance such as white spots and nonuniform luminance may be solved.

It should be noted that in the present disclosure, the light transmittance of the optical structure is adjusted by adjusting the light transmittance of the light controller 1.

The optical structure of the present disclosure is applicable to lighting products and display products, as well as architectural glass, automotive glass, product windows, and the like.

The optical sensing component 2 is configured to acquire the parameters related to the intensity of ambient light irradiating onto the corresponding sub-region, and actually the ambient light intensity signals are converted into other signals, such as a current signal, a voltage signal, and the like.

In some embodiments of the present disclosure, the optical sensing component 2 converts the ambient light intensity signal into a resistivity signal, then the optical sensing component 2 includes:

a photosensitive layer 3, where a resistivity of the photosensitive layer 3 is decreased with an increasing of the intensity of the ambient light irradiating onto the corresponding sub-region;

a first transparent electrode 4 and a second transparent electrode 5 at opposite sides of the photosensitive layer 3 and being opposite to each other.

Then, the controller is coupled to the first transparent electrode 4 and the second transparent electrode 5 and configured to apply a voltage to the first transparent electrode 4 and the second transparent electrode 5. To be specific, an absolute value of a voltage on the first transparent electrode 4 is larger than an absolute value of a voltage on the second transparent electrode 5, and the absolute value of the voltage on the second transparent electrode 5 is decreased with an increasing of a resistivity of the photosensitive layer 3 corresponding to the second transparent electrode 5, and the controller controls the light transmittance of the corresponding sub-region based on the voltage on the second transparent electrode 5.

Optionally, the photosensitive layer 3 may be made of selenium, aluminum sulfide, lead sulfide, bismuth sulfide or cadmium sulfide, and the resistivity thereof is decreased with an increasing of the intensity of the ambient light.

In some embodiments of the present disclosure, the light adjustment component 1 may further include:

a third transparent electrode 6 and a fourth transparent electrode;

an optical film layer 7 between the third transparent electrode 6 and the fourth transparent electrode, where a light transmittance of the optical film layer 7 is increased with an increasing of a voltage difference between the third transparent electrode 6 and the fourth transparent electrode;

where the controller 6 is coupled to the third transparent electrode and the fourth transparent electrode, and configured to apply a voltage to the third transparent electrode 6, apply the voltage on the second transparent electrode 5 to the fourth transparent electrode, and adjust the light transmittance of the optical film layer 7 by controlling a voltage difference between the second transparent electrode 5 and the third transparent electrode 6.

The light transmittance of the light adjustment component 1 is adjusted by adjusting the light transmittance of the optical film layer 7.

According to the light adjustment component hereinabove, the light transmittance of the optical film layer may be controlled by controlling a voltage difference between the second transparent electrode and the third transparent electrode, so that the voltage on the second transparent electrode may control the light transmittance of the optical film layer. Since the voltage on the second transparent electrode is increased with an increasing of the intensity of ambient light, therefore it is able to adjust automatically the light transmittance of the light adjustment component based on the intensity of ambient light.

In some embodiments of the present disclosure, the first transparent electrodes 4 of all the optical sensing components 2 are in a unitary structure, thereby simplifying the structure and the control.

Optionally, the second transparent electrode 5 and the fourth transparent electrode are integrated with each other, the third transparent electrode 6 is at a side of the second transparent electrode 5 away from the first transparent electrode 4, and the third transparent electrode 6 and the second transparent electrode 5 are opposite to each other, thereby simplifying the structure.

The optical film layer 7 of the light adjustment component 1 may specifically be a polymer dispersed liquid crystal layer, and the light transmittance of the optical film layer 7 is greater than or equal to 0. The polymer dispersed liquid crystal is a liquid crystal mixed with a prepolymer, and under certain conditions, a micron-sized liquid crystal droplets are formed and uniformly dispersed in a base composed of a polymer network. Since the optical axes of small droplets composed of liquid crystal molecules are oriented freely, and its refractive index does not match the refractive index of the base. When the light passes the polymer dispersed liquid crystals, the light is strongly scattered by the liquid crystal droplets, the optical film layer is opaque and reflective. The electric field may adjust the optical axis orientation of the liquid crystal droplets and adjust the transmittance of the polymer dispersed liquid crystal layer. When the refractive index of the liquid crystal droplet matches the refractive index of the substrate, the optical film layer 7 is in a transparent state to achieve light transmission. When the electric field is removed, the liquid crystal droplets return to their original free orientation. The prepolymer may be made of an acrylate polymer, the viscosity of the acrylate polymer is small, the curing speed thereof is fast, the UV resistance thereof is good, and the adhesion to the transparent conductive layer, the glass and the plastic is strong, and may provide a better overall performance. The polymer dispersed liquid crystal made of the acrylate polymer and the liquid crystal has the advantages of a large contrast ratio and a low driving voltage, etc.

In practical applications, it is generally desirable that the greater the intensity of ambient light, the smaller the light transmittance of the optical structure is, and the smaller the intensity of ambient light, the greater the light transmittance of the optical structure is, so as to reduce the light pollution and make full use of light.

According to the above technical solution, the resistivity of the photosensitive layer 3 is decreased with the increasing of the intensity of ambient light, and the voltage on the second transparent electrode 5 is increased with the decreasing of the resistivity of the photosensitive layer 3, that is, the voltage on the second transparent electrode 5 is increased with an increasing of the intensity of ambient light. Further, the light transmittance of the optical film layer 7 is controlled to decrease with the decreasing of the voltage difference between the second transparent electrode 5 and the third transparent electrode 6.

Of course, those skilled in the art may easily introduce, based on the principle of the present disclosure, without any creative work, that the light transmittance of the optical structure may be increased with the increasing of the intensity of ambient light.

For example, by controlling the material of the photosensitive layer 3, it is also able to make the resistivity of the photosensitive layer 3 to increase with the increasing of the intensity of ambient light, so that the light transmittance of the optical structure may be increased with the increasing of the intensity of ambient light.

In some embodiments of the present disclosure, in order to make the light transmittance of the light adjustment component 1 to decrease with the increasing of the intensity of ambient light, the same first voltage may be applied to the first transparent electrode 4 and the third transparent electrode 6, and the first voltage is a high voltage. Then, with the increasing of the intensity of ambient light, the resistivity of the photosensitive layer 3 decreases, and the voltage difference between the first transparent electrode 4 and the second transparent electrode 5 is decreased, that is, the voltage difference the second transparent electrode 5 and the third transparent electrode 6 is decreased, and the light transmittance of the optical film layer 7 is controlled to be decreased, and the light transmittance of the optical film layer 7 is decreased with the increasing of the intensity of ambient light.

Optionally, the first voltage is a fixed voltage, which is convenient for control.

The first voltage being a high voltage means that the first voltage has a larger absolute value. Taking the optical film layer 7 being a polymer dispersed liquid crystal as an example, when the voltage difference between the second transparent electrode 5 and the third transparent electrode 6 is equal to the first voltage, the optical film layer 7 is in a transparent state. Therefore, when the intensity of ambient light is weak, the voltage on the second transparent electrode 5 is almost 0, and the second transparent electrode 5 and the third transparent electrode 6 can provide a sufficiently large voltage difference to ensure the light transmission of the optical film layer 7 to be large.

It should be noted that the above is only an implementation structure of converting the ambient light intensity signal into the resistivity signal of the photosensitive layer, further obtaining a voltage signal that decreases as the resistivity of the photosensitive layer increases, and controlling the optical structure based on the voltage signal. Those skilled in the art will readily recognize that the structure of obtaining a voltage signal that decreases as the resistivity of the photosensitive layer increases is not limited to the specific structure of the optical sensing component described above. The light adjustment component is also not limited to the specific structure described above. For example, the voltage signal may be correspondingly processed (including a filter circuit and an amplifying circuit) and then applied to the light adjustment component, or the resistive signals may be converted to voltage signals through other circuit structure, which is not limited herein.

Further, in order to improve flexibility, the optical structure in some embodiments of the present disclosure further includes:

a controllable switch 10, where a first end of the controllable switch 10 is coupled to the first transparent electrode 4, a second end of the controllable switch 10 is coupled to the second transparent electrode 5;

the controller is further configured to control the controllable switch 10 to be turned on or off. When the controllable switch 10 is turned on, the first transparent electrode 4 and the second transparent electrode 5 are short-circuited, the controller applies a voltage to the third transparent electrode 6 according to a user instruction, and adjusts the light transmittance of the optical film layer 7 by controlling the voltage difference between the second transparent electrode 5 and the third transparent electrode 6.

When the optical film layer 7 is a polymer-dispersed liquid crystal, its light transmittance is increased with the increasing of the voltage difference between the second transparent electrode 5 and the third transparent electrode 6.

Figure 4:
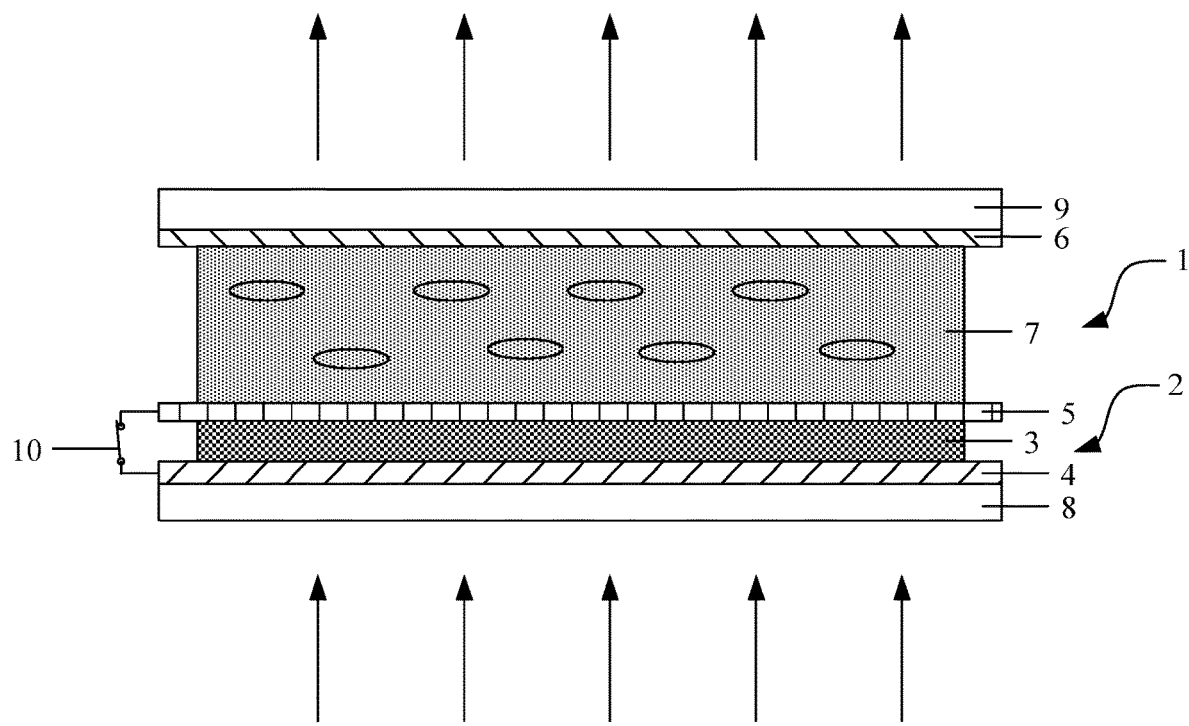
FIG. 4 is a schematic view showing an operation of an optical structure working in a manual adjustment mode when the optical structure is transparent in some embodiments of the present disclosure.
Figure 5:
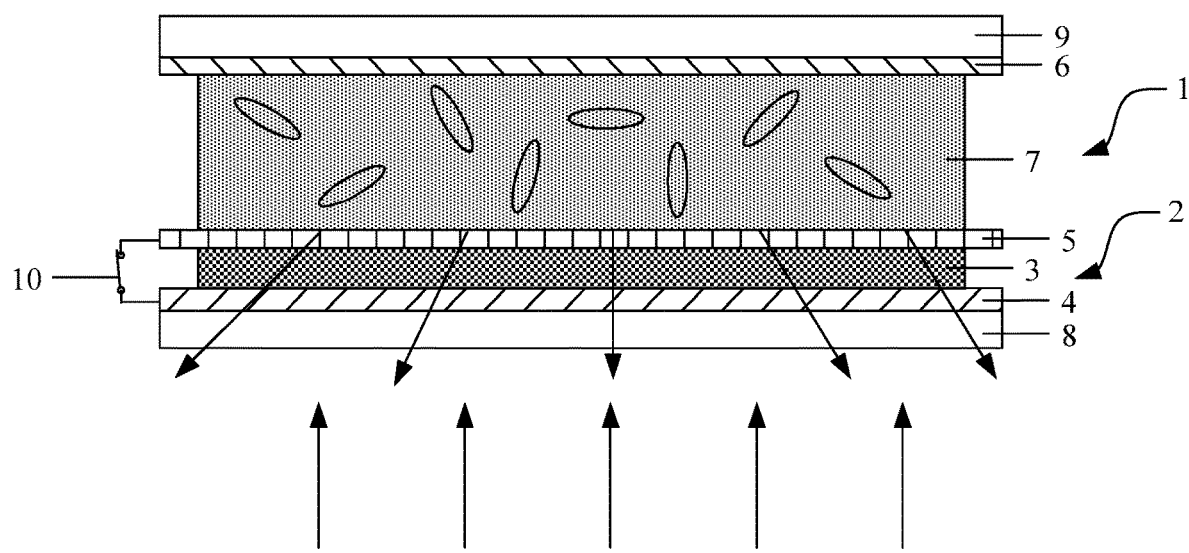
FIG. 5 is a schematic view showing an operation of an optical structure working in a manual adjustment mode when the optical structure is opaque in some embodiments of the present disclosure.

The optical structure described above includes a controllable switch 10 that causes the first transparent electrode 4 and the second transparent electrode 5 of the optical sensing component 2 to be shorted or disconnected by controlling the controllable switch 10 to be turned on or off. When the first transparent electrode 4 and the second transparent electrode 5 are disconnected, the resistivity of the photosensitive layer 3 located therebetween decreases as the intensity of ambient light increases, which causes the voltage on the second transparent electrode 5 to increase. The voltage difference between the second transparent electrode 5 and the third transparent electrode 6 is reduced, thereby controlling the light transmittance of the light adjustment component 1, and automatically adjusting the light transmittance of the optical structure according to the intensity of ambient light. Referring to FIG. 4 and FIG. 5, when the first transparent electrode 4 and the second transparent electrode 5 are short-circuited, the voltage on the second transparent electrode 5 is equal to the voltage on the first transparent electrode 4, and the voltage will not be changed with the ambient light, which is equivalent to turning off the optical sensor component 2. At this time, the voltage on the third transparent electrode 6 of the light adjustment component 1 may be manually adjusted to adjust the voltage difference applied to the optical film layer 7 of the light adjustment component 1, and the light transmittance of the optical film layer 7 may be increased with the increasing of the voltage difference between the second transparent electrode 5 and the third transparent electrode 6, thereby realizing a manual adjusting of the light transmittance of the optical structure. By the controllable switch, the user may switch the optical transmission rate adjustment mode to an automatic adjustment or a manual adjustment, which is more flexible and improves the user experience.

The specific structure and working process of the optical structure in some embodiments of the present disclosure are as follows:

The optical structure includes:

a light adjustment component 1 including at least two sub-regions;

at least two optical sensing components 2 arranged on a surface of the light adjustment component 1 and being in a one-to-one correspondence to positions of the sub-regions, where each of the optical sensing components 2 includes a first transparent electrode 4 and a second transparent electrode 5 disposed opposite to each other, and a photosensitive layer 3 disposed between the first transparent electrode 4 and the second transparent electrode 5, and the resistance of the photosensitive layer 3 decreases as the intensity of ambient light increases. Both ends of the first transparent electrode 4 and the second transparent electrode 5 are also respectively coupled to two ends of a controllable switch 10;

the light adjustment component 1 includes a third transparent electrode 6 disposed opposite to the second transparent electrode 5, and a polymer dispersed liquid crystal layer 7 disposed between the third transparent electrode 6 and the second transparent electrode 5, the third transparent electrode 6 is at a side of the second transparent electrode 5 away from the first transparent electrode 4;

a controller, coupled to the first transparent electrode 4 and the third transparent electrode 6, and configured to apply a voltage to the first transparent electrode 4 and the third transparent electrode 6, where the voltage on the second transparent electrode 5 decreases as the resistivity of the photosensitive layer 3 corresponding to the position of the second transparent electrode 5 increases, the light transmittance of the polymer dispersed liquid crystal layer 7 of each sub-region increases as the voltage difference between the second transparent electrode 5 and the third transparent electrode 6 corresponding to the position increases.

The optical sensing component 2 and the light adjustment component 1 are between the first substrate 8 and the second substrate 9.

The working process of the optical structure is:

First type: as shown in FIG. 2 and FIG. 3, the controllable switch 10 is turned off, and the automatic adjustment mode is adopted.

The voltage applied to the first transparent electrode 4 and the third transparent electrode 6 is controlled to be a high voltage.

When the intensity of ambient light is weak, the photosensitive layer 3 is in a high resistivity state, and then the voltage on the second transparent electrode 5 is a low voltage, and the second transparent electrode 5 and the third transparent electrode 6 have a voltage difference there between, resulting in rotations of liquid crystal droplets in the polymer dispersed liquid crystal layer 7, and the light transmittance of the light modulating component 1 is high, so that the light transmittance of the optical structure is high.

When the intensity of ambient light is strong, the photosensitive layer 3 is in a low resistivity state, and then the voltage on the second transparent electrode 5 is a high voltage, and the second transparent electrode 5 and the third transparent electrode 6 do not have a voltage difference there between, resulting in a free orientation of liquid crystal droplets in the polymer dispersed liquid crystal layer 7, and the light transmittance of the light adjusting component 1 is low, so that the light transmittance of the optical structure is low.

Second type: as shown in FIG. 4 and FIG. 5, the controllable switch 10 is turned on, and the manual adjustment mode includes:

The voltage applied to the first transparent electrode 4 is controlled to be a low voltage, the optical sensing component 2 is turned off, and the voltage on the second transparent electrode 5 is also a low voltage.

The voltage applied to the third transparent electrode 6 may be manually adjusted to adjust the voltage difference between the second transparent electrode 5 and the third transparent electrode 6, thereby controlling the liquid crystal droplets in the polymer dispersed liquid crystal layer 7 to rotate, thereby realizing a manual adjusting of the light transmission rate of the optical structure.

In the manual adjustment mode, it is also able to directly control the voltage applied to the third transparent electrode 6 to be a high voltage, and the second transparent electrode 5 and the third transparent electrode 6 have a voltage difference there between, and then the liquid crystal droplets in the polymer dispersed liquid crystal layer 7 are rotated, and the light transmittance of the light adjustment component 1 is high.

When the intensities of the ambient light irradiating onto different sub-regions of the light adjustment component 1 are different, the light transmittance of each sub-region of the optical film layer 7 may be controlled independently. Specifically, in the automatic adjustment mode, the voltage on the second transparent electrode 5 of each optical sensing component 2 increases as the intensity of ambient light of the corresponding sub-region of the second transparent electrode 5 increases, thereby the voltage difference between the second transparent electrode 5 and the third transparent electrode 6 decreases as the intensity of ambient light of the sub-region corresponding to the second transparent electrode 5 increases, and the light transmittance of the sub-region is controlled to decrease with the increasing of the intensity of ambient light. Further, the light transmittance of the entire optical film layer 7 may be controlled to be identical, so that even intensities of ambient light of different sub-regions are different, the light transmittance of the entire optical structure may be identical. When the light adjustment component is applied to the flat lighting product and such optical structure is arranged at the optical path of the lighting product, the appearance such as white spots and nonuniform luminance may be solved.

In some embodiments of the present disclosure, the working principle of the present disclosure is specifically described by taking the optical sensing component converting an ambient light intensity signal into a resistivity signal as an example. It can be understood that the optical sensing component is also able to convert the ambient light intensity signal into signals of other devices, such as a thin film transistor. When different intensities of ambient light illuminates the channel of the thin film transistor, the light leakage currents of the thin film transistor are different, thereby converting the ambient light intensity signal into a thin film transistor light leakage current. By the light adjustment component structure, it is able to control the light transmittance of the light adjustment component based on parameters related to intensity of ambient light acquired by the optical sensing component. In order to increase flexibility, the optical sensing component may also be turned off according to the user's instruction, and the light transmittance of the light adjustment component may be manually adjusted.

A display device is further provided in some embodiments of the present disclosure, which applies the optical structure as described above. The optical structure is at a display side of the display panel, to automatically adjust the light transmittance of the optical structure according to the intensity of ambient light, thereby improving the user experience. The light transmittance of different regions of the display device may be adjusted, so that the light transmittance of the entire optical structure may be identical, thereby avoiding the display quality from be adversely affected due to different intensities of ambient light at different regions of the product.

The optical structure of the present disclosure may also be applied to an electronic device, which may reduce the light transmittance of the optical structure when the intensity of ambient light is strong, thereby delaying the aging degree and time of the irradiated electronic device. It is also able to increase the light transmittance of the optical structure when the intensity of ambient light is strong, thereby increasing the light utilization ratio and being more flexible.

The electronic device may be, for example, a lighting device including a light source, with the optical structure at a light-emitting side of the light source, the light emitted by the light source passes through the optical structure and then emits out. In addition, the partition control may enable the light transmittance of the entire optical structure to be identical, thereby the appearance such as white spots and nonuniform luminance of the flat lighting product may be solved.

Of course, the optical structure may also be used only as a glass, such as on a window, a building. It can also be applied to automobiles, in particular, the window glass of an automobile adopts the optical structure of the present disclosure.

As shown in FIG. 1 to FIG. 3, a method for controlling an optical structure is further provided in some embodiments of the present disclosure, including:

acquiring an intensity of ambient light irradiating onto each sub-region of the light adjustment component 1; and controlling a light transmittance of the each sub-region based on the intensity of the ambient light irradiating onto the each sub-region.

According to the above method, the light transmittance of the optical structure may be controlled automatically based on the intensity of ambient light, thereby improving the user experience. At the same time, the partition control is performed on the light adjustment component, and the light transmittance of the corresponding sub-region is controlled based on the parameters related to the intensity of ambient light irradiating onto each sub-region, so that the light transmittance of the entire light adjustment component may be ensured to be identical, thereby improving user experience.

It should be noted that in the present disclosure, the light transmittance of the optical structure is adjusted by adjusting the light transmittance of the light controller 1.

The acquiring of the parameters related to the intensity of ambient light irradiating onto the light controller 1 actually refers to converting the ambient light intensity signals into other signals, such as a current signal, a voltage signal, and the like.

In some embodiments of the present disclosure, the optical sensing component 2 includes a photosensitive layer 3, and the resistivity of the photosensitive layer 3 decreases as the intensity of ambient light increases, the control method is to control the light transmittance of the light adjustment component based on the resistivity of the photosensitive layer. The specific structure of the optical sensing component 2 is described in the above embodiments, and will not be described in detail herein.

Specifically, the photosensitive layer 3 may be made of selenium, aluminum sulfide, lead sulfide, bismuth sulfide or cadmium sulfide, and the electrical resistivity thereof decreases as the intensity of ambient light increases.

The control process of the optical structure of the present disclosure will be specifically described below by taking converting an ambient light intensity signal into a resistivity signal as an example.

In some embodiments of the present disclosure, the controlling the light transmittance of the each sub-region based on the intensity of the ambient light irradiating onto the each sub-region further includes:

adjusting the light transmittance of the sub-region, by applying a first voltage to the first transparent electrode and the third transparent electrode, and controlling a second voltage on the second transparent electrode corresponding to the sub-region, which further includes:

in the case that the intensity of the ambient light irradiating onto the each sub-region of the light adjustment component decreases and then a resistivity of the photosensitive layer corresponding to the each sub-region is increased, applying the first voltage to the first transparent electrode and the third transparent electrode, and controlling the second voltage on the second transparent electrode corresponding to the each sub-region to change away from a value of the first voltage, to enable a voltage difference between the first voltage and the second voltage to be increased to increase the light transmittance of the each sub-region;

in the case that the intensity of the ambient light irradiating onto the each sub-region of the light adjustment component increases and then a resistivity of the photosensitive layer corresponding to the each sub-region is decreased, applying the first voltage to the first transparent electrode and the third transparent electrode, and controlling the second voltage on the second transparent electrode corresponding to the each sub-region to change towards a value of the first voltage, to enable a voltage difference between the first voltage and the second voltage to be decreased to decrease the light transmittance of the each sub-region.

In some embodiments of the present disclosure, the method further includes: in the case that the intensity of the ambient light irradiating onto the each sub-region of the light adjustment component 1 is smaller than a first set value and then a resistivity of the photosensitive layer 3 corresponding to the each sub-region is larger than a second set value, applying a first voltage to the first transparent electrode 4 and the third transparent electrode 6, and controlling a voltage on the second transparent electrode 5 corresponding to the each sub-region to be a second voltage, to enable, by controlling a voltage difference between the first voltage and the second voltage, the light transmittance of the each sub-region to be increased.

In some embodiments of the present disclosure, the method further includes: in the case that the intensity of the ambient light irradiating onto the each sub-region of the light adjustment component is larger than a first set value and then a resistivity of the photosensitive layer corresponding to the each sub-region is smaller than a second set value, applying a first voltage to the first transparent electrode and the third transparent electrode, and controlling a voltage on the second transparent electrode corresponding to the each sub-region to be a second voltage, to enable, by controlling a voltage difference between the first voltage and the second voltage, the light transmittance of the each sub-region to be decreased.

According to the above method, when the intensity of ambient light of a sub-region is weak, the light transmittance of the sub-region is controlled to increase, and when the intensity of ambient light of a sub-region is strong, the light transmittance of the sub-region is controlled to decrease, so that the light transmittance of the entire optical structure may be identical.

In the above control method, the first voltage applied to the first transparent electrode and the third transparent electrode may specifically be a high voltage. Then, when the intensity of ambient light of a sub-region of the illumination light adjustment component is smaller than the first set value, the resistivity of the photosensitive layer corresponding to the sub-region is larger than the second set value, and the second voltage on the second transparent electrode may be controlled to be a low voltage, so that there is a voltage difference between the second transparent electrode and the third transparent electrode, thereby controlling the liquid crystal droplets of the polymer dispersed liquid crystal layer of the sub-region to rotate, and the light transmittance is increased. When the intensity of ambient light of a sub-region of the light adjustment component is larger than the first set value, the resistivity of the photosensitive layer corresponding to the sub-region is smaller than the second set value, and the second voltage on the second transparent electrode may be controlled to be a high voltage, such that there is no voltage difference between the second transparent electrode and the third transparent electrode, thereby controlling the liquid crystal droplets of the polymer dispersed liquid crystal layer of the sub-region to be orientated freely, and the light transmittance is decreased.

According to the above description, the first voltage is a high voltage, which means that the first voltage has a large absolute value, and when the voltage difference between the second transparent electrode and the third transparent electrode is equal to the first voltage, the liquid crystal droplets of the polymer dispersed liquid crystal layer are controlled to rotate, so that the polymer dispersed liquid crystal layer is in a transparent state.

Furthermore, in order to improve flexibility, the method for controlling the optical structure in some embodiments of the present disclosure further includes:

controlling the first transparent electrode and the second transparent electrode to short with each other;

in the case that the intensity of the ambient light irradiating onto the each sub-region of the light adjustment component is larger than a first set value, applying a third voltage to the first transparent electrode and the second transparent electrode, applying a fourth voltage to the third transparent electrode in response to a user instruction, to enable the light transmittance of the optical film layer to increase by adjusting a voltage difference between the third transparent electrode and the fourth transparent electrode.

According to the above method, by short-circuiting the first transparent electrode and the second transparent electrode, even if the resistivity of the photosensitive layer changes with different ambient light intensities, and the voltage on the second transparent electrode is always the same with the voltage on the first transparent electrode, which is equivalent to turning off the optical sensor component. At this time, the voltage on the third transparent electrode may be manually adjusted to adjust the voltage difference between the second transparent electrode and the third transparent electrode to control the light transmittance of the optical film layer.

The third voltage may be a low voltage, and the fourth voltage may be a high voltage. The low voltage and the high voltage are relative, and they may be a range value, and the specific value may be determined according to the characteristics of the optical film layer. Taking the optical film layer being a polymer dispersed liquid crystal layer as an example, the voltage difference between the third voltage and the fourth voltage may be such determined that the rotation of the liquid crystal droplets of the polymer dispersed liquid crystal layer may be controlled by the voltage difference and the light transmittance may be increased. The specific values of the third voltage and the fourth voltage are not limited herein.

According to the technical solution of the present disclosure, by controlling the short-circuiting or disconnecting between the first transparent electrode and the second transparent electrode, it is able to realize a flexible switching between automatically adjusting the light transmittance of the optical structure based on the intensity of ambient light and manually adjusting the light transmittance of the optical structure, thereby being more flexible improving the user experience. Specifically, when the first transparent electrode and the second transparent electrode are disconnected, the light transmittance of the optical structure may be automatically adjusted based on the intensity of ambient light. When the first transparent electrode and the second transparent electrode are short-circuited, the voltage on the second transparent electrode is equal to the voltage on the first transparent electrode, and the light transmittance does not change with the change of the intensity of ambient light, which is equivalent to turning off the optical sensing component. At this time, the voltage on the third transparent electrode of the light adjustment component may be manually adjusted to adjust the voltage difference applied to the optical film layer of the light adjustment component, and the light transmittance of the optical film layer increases with the increasing of the voltage difference between the second transparent electrode and the third transparent electrode, thereby realizing a manual adjusting of the optical structure.

Referring to FIGS. 1-3, the specific control process of the optical structure in some embodiments of the present disclosure includes:

The optical structure has two control modes:

First type: an automatic adjustment mode shown in FIG. 2 and FIG. 3.

the connection between the first transparent electrode 4 and the second transparent electrode 5 is controlled to be turned off, and the voltage applied to the first transparent electrode 4 and the third transparent electrode 6 is controlled to be a high voltage.

When the intensity of ambient light is weak, the photosensitive layer 3 is in a high resistivity state, and then the voltage on the second transparent electrode 5 is a low voltage, and the second transparent electrode 5 and the third transparent electrode 6 have a voltage difference therebetween, resulting in rotations of liquid crystal droplets in the polymer dispersed liquid crystal layer 7, and the light transmittance of the light modulating component 1 is high, so that the light transmittance of the optical structure is high;

When the intensity of ambient light is strong, the photosensitive layer 3 is in a low resistivity state, and then the voltage on the second transparent electrode 5 is a high voltage, and the second transparent electrode 5 and the third transparent electrode 6 do not have a voltage difference therebetween, resulting in a free orientation of liquid crystal droplets in the polymer dispersed liquid crystal layer 7, and the light transmittance of the light adjusting component 1 is low, so that the light transmittance of the optical structure is low.

Second type: a manual adjustment mode referring to FIG. 4 and FIG. 5,

The first transparent electrode 4 is controlled to be short-circuited to the second transparent electrode 5, the voltage applied to the first transparent electrode 4 is controlled to be a low voltage and the voltage applied to the second transparent electrode 5 is controlled to be a low voltage, the optical sensing component 2 is turned off.

The voltage applied to the third transparent electrode 6 may be manually adjusted to adjust the voltage difference between the second transparent electrode 5 and the third transparent electrode 6, thereby controlling the liquid crystal droplets in the polymer dispersed liquid crystal layer 7 to rotate, thereby realizing a manual adjusting of the light transmission rate of the optical structure.

In the manual adjustment mode, it is also able to directly control the voltage applied to the third transparent electrode 6 to be a high voltage, and the second transparent electrode 5 and the third transparent electrode 6 have a voltage difference there between, and then the liquid crystal droplets in the polymer dispersed liquid crystal layer 7 are rotated, and the light transmittance of the light adjustment component 1 is high.

When the intensities of the ambient light irradiating onto different sub-regions of the light adjustment component 1 are different, the light transmittance of each sub-region of the optical film layer 7 may be controlled independently. Specifically, in the automatic adjustment mode, the voltage on the second transparent electrode 5 of each optical sensing component 2 increases as the intensity of ambient light of the corresponding sub-region of the second transparent electrode 5 increases, thereby the voltage difference between the second transparent electrode 5 and the third transparent electrode 6 decreases as the intensity of ambient light of the sub-region corresponding to the second transparent electrode 5 increases, and the light transmittance of the sub-region is controlled to decrease with the increasing of the intensity of ambient light. Further, the light transmittance of the entire optical film layer 7 may be controlled to be identical, so that even intensities of ambient light of different sub-regions are different, the light transmittance of the entire optical structure may be identical. When the light adjustment component is applied to the flat lighting product and such optical structure is arranged at the optical path of the lighting product, the appearance such as white spots and nonuniform luminance may be solved.

The above are merely some embodiments of the present disclosure. A person skilled in the art may make further replacements and improvements without departing from the principle of the present disclosure, and these replacements and improvements shall also fall within the scope of the present disclosure.

What is claimed is:

1. An optical structure, comprising:
   a light adjustment component;
   an optical sensing component arranged on a surface of the light adjustment component, wherein the optical sensing component is configured to acquire an intensity of ambient light irradiating onto the light adjustment component; and
   a controller, coupled to the optical sensing component and the light adjustment component;
   wherein the optical sensing component comprises:
   a photosensitive layer, wherein a resistivity of the photosensitive layer is decreased with an increasing of the intensity of the ambient light irradiating onto the light adjustment component;
   a first transparent electrode and a second transparent electrode at opposite sides of the photosensitive layer and being opposite to each other;
   wherein the controller is coupled to the first transparent electrode and the second transparent electrode and configured to apply a voltage to the first transparent electrode and the second transparent electrode;
   wherein the light adjustment component comprises:
   a third transparent electrode and a fourth transparent electrode;
   an optical film layer between the third transparent electrode and the fourth transparent electrode, wherein a light transmittance of the optical film layer is increased with an increasing of a voltage difference between the third transparent electrode and the fourth transparent electrode;
   wherein the controller is coupled to the third transparent electrode and the fourth transparent electrode, and configured to apply a voltage to the third transparent electrode, apply the voltage on the second transparent electrode to the fourth transparent electrode, and adjust the light transmittance of the optical film layer by controlling a voltage difference between the second transparent electrode and the third transparent electrode;
   wherein the second transparent electrode and the fourth transparent electrode are integrated with each other, the third transparent electrode is at a side of the second transparent electrode away from the first transparent electrode;

the optical structure further comprises:
a controllable switch, wherein a first end of the controllable switch is coupled to the first transparent electrode, a second end of the controllable switch is coupled to the second transparent electrode;
wherein the controller is further configured to control the controllable switch to be turned on to short the first transparent electrode and the second transparent electrode, apply a voltage to the third transparent electrode in response to a user instruction, and adjust the light transmittance of the optical film layer by controlling the voltage difference between the second transparent electrode and the third transparent electrode.

2. The optical structure according to claim 1, wherein the optical film layer is a polymer dispersed liquid crystal layer.

3. The optical structure according to claim 1, wherein a material of the photosensitive layer comprises selenium, aluminum sulfide, lead sulfide, bismuth sulfide or cadmium sulfide.

4. A method for controlling an optical structure, wherein the optical structure comprises:
a light adjustment component comprising at least two sub-regions;
at least two optical sensing components arranged on a surface of the light adjustment component and being in a one-to-one correspondence to positions of the sub-regions, each optical sensing component is configured to acquire an intensity of ambient light irradiating onto a corresponding sub-region; and
a control component, coupled to the optical sensing component and the light adjustment component,
wherein the optical sensing component comprises:
a photosensitive layer, wherein a resistivity of the photosensitive layer is decreased with an increasing of the intensity of the ambient light irradiating onto the light adjustment component;
a first transparent electrode and a second transparent electrode at opposite sides of the photosensitive layer and being opposite to each other;
wherein the controller is coupled to the first transparent electrode and the second transparent electrode and configured to apply a voltage to the first transparent electrode and the second transparent electrode;
wherein the light adjustment component comprises:
a third transparent electrode and a fourth transparent electrode;
an optical film layer between the third transparent electrode and the fourth transparent electrode, wherein a light transmittance of the optical film layer is increased with an increasing of a voltage difference between the third transparent electrode and the fourth transparent electrode;
wherein the controller is coupled to the third transparent electrode and the fourth transparent electrode, and configured to apply a voltage to the third transparent electrode, apply the voltage on the second transparent electrode to the fourth transparent electrode, and adjust the light transmittance of the optical film layer by controlling a voltage difference between the second transparent electrode and the third transparent electrode;
wherein the second transparent electrode and the fourth transparent electrode are integrated with each other, the third transparent electrode is at a side of the second transparent electrode away from the first transparent electrode;

the optical structure further comprises:
a controllable switch, wherein a first end of the controllable switch is coupled to the first transparent electrode, a second end of the controllable switch is coupled to the second transparent electrode;
wherein the controller is further configured to control the controllable switch to be turned on to short the first transparent electrode and the second transparent electrode, apply a voltage to the third transparent electrode in response to a user instruction, and adjust the light transmittance of the optical film layer by controlling the voltage difference between the second transparent electrode and the third transparent electrode;
the method comprises:
acquiring an intensity of ambient light irradiating onto each sub-region of the light adjustment component; and
controlling a light transmittance of the each sub-region based on the intensity of the ambient light irradiating onto the each sub-region;
wherein the method further comprises:
controlling the first transparent electrode and the second transparent electrode to short with each other; and
applying a third voltage to the first transparent electrode and the second transparent electrode, applying a fourth voltage to the third transparent electrode in response to a user instruction, to control the light transmittance of the optical film layer by adjusting a voltage difference between the third transparent electrode and the fourth transparent electrode.

5. The method according to claim 4, wherein the controlling the light transmittance of the each sub-region based on the intensity of the ambient light irradiating onto the each sub-region further comprises:
in the case that the intensity of the ambient light irradiating onto the each sub-region of the light adjustment component is smaller than a first set value and then a resistivity of the photosensitive layer corresponding to the each sub-region is larger than a second set value, applying a first voltage to a first transparent electrode and a third transparent electrode, and controlling a voltage on a second transparent electrode corresponding to the each sub-region to be a second voltage, to enable, by controlling a voltage difference between the first voltage and the second voltage, the light transmittance of the each sub-region to be increased.

6. The method according to claim 4, wherein the controlling the light transmittance of the each sub-region based on the intensity of the ambient light irradiating onto the each sub-region further comprises:
in the case that the intensity of the ambient light irradiating onto the each sub-region of the light adjustment component is larger than a first set value and then a resistivity of the photosensitive layer corresponding to the each sub-region is smaller than a second set value, applying a first voltage to the first transparent electrode and the third transparent electrode, and controlling a voltage on the second transparent electrode corresponding to the each sub-region to be a second voltage, to enable, by controlling a voltage difference between the first voltage and the second voltage, the light transmittance of the each sub-region to be decreased.

7. The method according to claim 4, wherein the controlling the light transmittance of the each sub-region based on the intensity of the ambient light irradiating onto the each sub-region further comprises:
adjusting the light transmittance of the each sub-region, by applying a first voltage to the first transparent electrode and the third transparent electrode of the each sub-region and controlling a second voltage of the second transparent electrode corresponding to the each sub-region.

8. The method according to claim 7, further comprising:
in the case that the intensity of the ambient light irradiating onto the each sub-region of the light adjustment component decreases and then a resistivity of the photosensitive layer corresponding to the each sub-region is increased, applying the first voltage to the first transparent electrode and the third transparent electrode, and controlling the second voltage on the second transparent electrode corresponding to the each sub-region to change away from a value of the first voltage, to enable a voltage difference between the first voltage and the second voltage to be increased to increase the light transmittance of the each sub-region.

9. The method according to claim 7, further comprising:
in the case that the intensity of the ambient light irradiating onto the each sub-region of the light adjustment component increases and then a resistivity of the photosensitive layer corresponding to the each sub-region is decreased, applying the first voltage to the first transparent electrode and the third transparent electrode, and controlling the second voltage on the second transparent electrode corresponding to the each sub-region to change towards a value of the first voltage, to enable a voltage difference between the first voltage and the second voltage to be decreased to decrease the light transmittance of the each sub-region.

10. The method according to claim 4, further comprising:
controlling the light transmittance of the each sub-region based on the intensity of the ambient light irradiating onto the each sub-region, and enabling the light transmittances of at least two sub-regions of the light adjustment component to be identical.

11. A display device comprising the optical structure according to claim 1.

12. An optical structure, comprising:
a first transparent electrode and a second transparent electrode opposite to each other;
a photosensitive layer between the first transparent electrode and the second transparent electrode;
a third transparent electrode and a fourth transparent electrode opposite to each other;
an optical film layer between the third transparent electrode and the fourth transparent electrode; and
a controller, coupled to the first transparent electrode and the third transparent electrode and configured to apply a voltage to the first transparent electrode and the third transparent electrode respectively,
wherein the first transparent electrode, the photosensitive layer, the second transparent electrode, the fourth transparent electrode, the optical film layer and the third transparent electrode are sequentially stacked;
wherein the optical structure further comprises:
a switch, wherein a first end of the switch is coupled to the first transparent electrode, a second end of the switch is coupled to the second transparent electrode;
wherein the controller is further configured to control the switch to be turned on to short the first transparent electrode and the second transparent electrode, apply a voltage to the third transparent electrode in response to a user instruction, and adjust the light transmittance of the optical film layer by controlling the voltage difference between the second transparent electrode and the third transparent electrode.

13. The optical structure according to claim 12, wherein the second transparent electrode and the fourth transparent electrode are integrated with each other, wherein the third transparent electrode is at a side of the second transparent electrode away from the first transparent electrode.

14. The optical structure according to claim 12, wherein a resistivity of the photosensitive layer is negatively correlated with the ambient light irradiating;
a light transmittance of the optical film layer is positively correlated with a voltage difference between the third transparent electrode and the fourth transparent electrode.

* * * * *